(12) United States Patent
Fruhauf et al.

(10) Patent No.: US 7,372,290 B2
(45) Date of Patent: May 13, 2008

(54) SYSTEM AND METHOD FOR USING DUMMY CYCLES TO MASK OPERATIONS IN A SECURE MICROCONTROLLER

(75) Inventors: Serge F. Fruhauf, Cupertino, CA (US); Alain C. Pomet, Rousset (FR)

(73) Assignees: STMicroelectronics, Inc., Carrollton, TX (US); STMicroelectronics S.A. (FR)

( * ) Notice: Subject to any disclaimer, the term of this patent is extended or adjusted under 35 U.S.C. 154(b) by 109 days.

(21) Appl. No.: 11/243,329

(22) Filed: Oct. 4, 2005

(65) Prior Publication Data

US 2007/0075732 A1    Apr. 5, 2007

(51) Int. Cl.
*H03K 19/00*    (2006.01)
(52) U.S. Cl. .................... 326/8; 326/46; 326/93
(58) Field of Classification Search .............. 326/8, 326/37, 38, 46, 93–98; 902/26
See application file for complete search history.

(56) References Cited

U.S. PATENT DOCUMENTS

| | | | |
|---|---|---|---|
| 5,944,833 A | 8/1999 | Ugon | |
| 6,247,134 B1 * | 6/2001 | Sproch et al. | 713/320 |
| 6,804,782 B1 | 10/2004 | Qiu et al. | |
| 6,907,534 B2 * | 6/2005 | Ku | 713/320 |
| 2003/0005340 A1 * | 1/2003 | Ku | 713/300 |
| 2004/0233749 A1 | 11/2004 | Fujisaki | |
| 2006/0265570 A1 * | 11/2006 | Bancel et al. | 712/34 |

FOREIGN PATENT DOCUMENTS

EP    1 006 492 A    6/2000

* cited by examiner

*Primary Examiner*—Don Le
(74) *Attorney, Agent, or Firm*—Lisa K. Jorgenson; William A. Munck

(57) ABSTRACT

A secure device includes a memory capable of storing information. The secure device also includes a secure microcontroller capable of securing the information in the memory. The secure microcontroller includes a plurality of registers. The secure microcontroller also includes combinatorial logic capable of receiving at least one output value provided by at least one of the registers. The combinatorial logic is also capable of performing one or more combinatorial operations using the at least one received output value. In addition, the secure microcontroller includes dummy cycle circuitry capable of causing one or more of the registers and the combinatorial logic to change state and consume current during one or more dummy cycles.

20 Claims, 4 Drawing Sheets

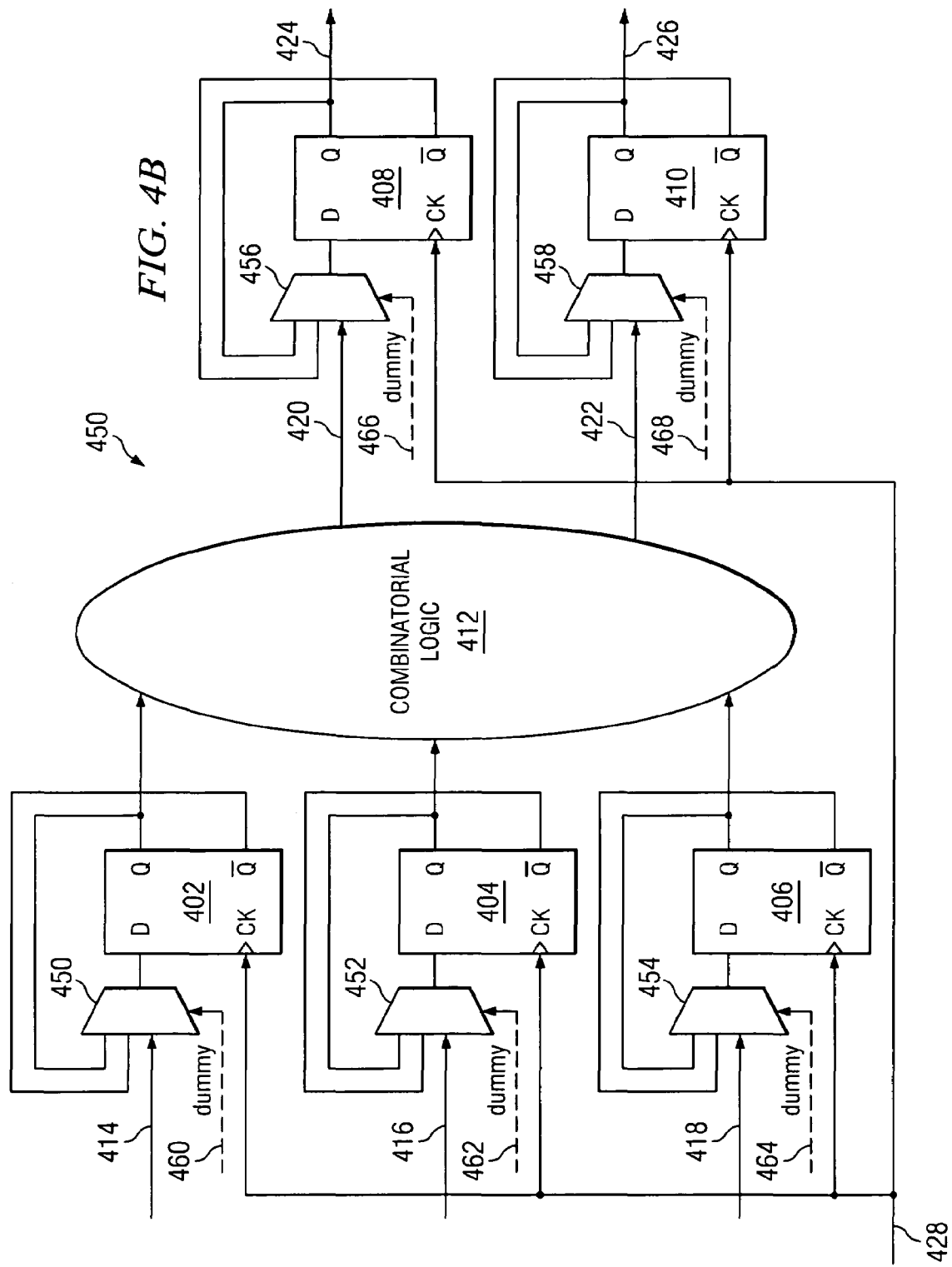

SYSTEM AND METHOD FOR USING DUMMY CYCLES TO MASK OPERATIONS IN A SECURE MICROCONTROLLER

TECHNICAL FIELD

This disclosure is generally directed to secure devices and more specifically to a system and method for using dummy cycles to mask operations in a secure microcontroller.

BACKGROUND

Smartcards and other secure devices are routinely used to identify personnel or provide other security features. For example, smartcards are often used to identify particular computer users, where authorized users may use a computing device or access a computing system after identification. As another example, smartcards are often used in television distribution systems, such as in cable and satellite television receivers, to control which customers receive service.

Hackers and other people routinely attempt to illicitly access secure information stored on smartcards or other secure devices. Different techniques have been used to access information stored on the smartcards and other secure devices, such as current analysis and electromagnetism analysis. Conventional smartcards previously used "dummy cycles" in an attempt to defeat these techniques. Dummy cycles represent periods of time where the conventional smartcards attempt to mask their normal operations. In theory, by randomizing when dummy cycles are used, it is more difficult to identify how the conventional smartcards operate and to access the secure information. However, dummy cycles typically create a recognizable signature that can be detected with accurate current analysis or electromagnetism analysis, allowing the protection provided by the dummy cycles to be easily overcome.

SUMMARY

This disclosure provides a system and method for using dummy cycles to mask operations in a secure microcontroller.

In a first embodiment, an apparatus includes a plurality of registers. The apparatus also includes combinatorial logic capable of receiving at least one output value provided by at least one of the registers. The combinatorial logic is also capable of performing one or more combinatorial operations using the at least one received output value. In addition, the apparatus includes dummy cycle circuitry capable of causing one or more of the registers and the combinatorial logic to change state and consume current during one or more dummy cycles.

In a second embodiment, a secure device includes a memory capable of storing information. The secure device also includes a secure microcontroller capable of securing the information in the memory. The secure microcontroller includes a plurality of registers. The secure microcontroller also includes combinatorial logic capable of receiving at least one output value provided by at least one of the registers. The combinatorial logic is also capable of performing one or more combinatorial operations using the at least one received output value. In addition, the secure microcontroller includes dummy cycle circuitry capable of causing one or more of the registers and the combinatorial logic to change state and consume current during one or more dummy cycles.

In a third embodiment, a method includes operating a plurality of registers and combinatorial logic. The combinatorial logic is capable of receiving at least one output value provided by at least one of the registers. The combinatorial logic is also capable of performing one or more combinatorial operations using the at least one received output value. The method also includes, during operation of the registers and the combinatorial logic, causing one or more of the registers and the combinatorial logic to change state and consume current during one or more dummy cycles.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIGS. 4A and 4B illustrate example circuits for using dummy cycles in a secure microcontroller according to one embodiment of this disclosure.

DETAILED DESCRIPTION

Figure 1:
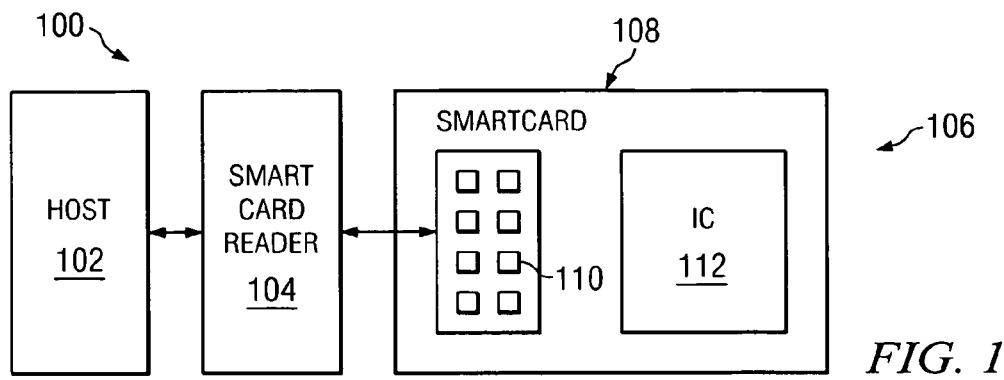
FIG. 1 illustrates an example system with a secure device according to one embodiment of this disclosure.

FIG. 1 illustrates an example system 100 with a secure device according to one embodiment of this disclosure. In this example, the system 100 includes a host 102, a smartcard reader 104, and a smartcard 106. This embodiment of the system 100 is for illustration only. Other embodiments of the system may be used without departing from the scope of this disclosure.

The host 102 is coupled to or otherwise interacts with the smartcard reader 104. The host 102 includes any suitable device or system capable of interfacing with the smartcard 106 and using information stored on the smartcard 106 to perform one or more functions. For example, the host 102 could represent a computing device, such as a desktop computer, laptop computer, or handheld computer. In this example, the computing device could use the information stored on the smartcard 106 to identify a user and control user access to the computing device, a computing system, or a portion thereof. As another example, the host 102 could represent a cable or satellite television receiver that uses the information on the smartcard 106 to determine whether a customer is allowed to receive particular television services. As yet another example, the host 102 could represent an automated teller machine (ATM) or other banking machine or a point-of-sale (POS) device such as a cash register. In this example, the ATM, banking machine, or POS device could use the information on the smartcard 106 to provide access to a bank or other account, to debit a bank or other account, or to charge an expense to a bank or other account. The host 102 could represent any other or additional type of device or system.

The smartcard reader 104 is coupled to or otherwise interacts with the host 102. The smartcard reader 104 is also capable of receiving or otherwise interfacing with the smartcard 106. The smartcard reader 104 interacts with the smartcard 106 to send information to or receive information from the smartcard 106. For example, the smartcard reader 104 could allow the host 102 to communicate information to the smartcard 106. The smartcard reader 104 could also allow the smartcard 106 to provide information to the host 102. This may allow, for example, the host 102 and the smartcard 106 to interact so that the host 102 can retrieve the secure information from the smartcard 106. This may also allow the host 102 to authenticate the smartcard 106 or the information contained on the smartcard 106. The smartcard reader 104 represents any suitable structure or device for facilitating communication between the host 102 and the smartcard 106.

The smartcard reader 104 could support one or multiple protocols or standards for communicating with the smartcard 106. For example, the smartcard reader 104 could represent an International Organization for Standardization (ISO) 7816 smartcard reader, a Universal Serial Bus (USB) smartcard reader, or any other or additional type of smartcard reader. Also, a single smartcard reader 104 could be capable of using multiple protocols or standards to communicate with multiple types of smartcards 106.

The host 102 and the smartcard reader 104 may also communicate in any suitable manner. For example, the host 102 and the smartcard reader 104 could communicate over a serial interface, a USB bus, a wireless interface, or any other suitable interface. Also, the host 102 and the smartcard reader 104 could be configured to communicate over multiple interfaces, such as both a serial interface and a USB bus.

The smartcard 106 is capable of interfacing with the smartcard reader 104 for interaction with the host 102. The smartcard 106 represents a secure device capable of storing and securing information. For example, the smartcard 106 could store information identifying a computer user, information used to receive cable or satellite television services, or monetary, banking, or account information. The smartcard 106 could also store security keys or other information used to secure the smartcard 106. The smartcard 106 could store any other or additional information for any other or additional use or purpose.

In this example, the smartcard 106 includes a carrier 108, a set of contacts 110, and an integrated circuit (IC) 112. The carrier 108 is capable of carrying or supporting the other components of the smartcard 106. For example, the carrier 108 could represent a plastic card or other structure for carrying the contacts 110 and the integrated circuit 112. The carrier 108 could have any suitable size or shape, such as a rectangular shape that is thin and small enough to fit inside a wallet like a credit card. Also, the carrier 108 could be formed from any suitable material or materials, such as plastic.

The contacts 110 provide an electrical connection between the smartcard reader 104 and the integrated circuit 112. For example, two contacts 110 could represent connections for receiving operating power (Vcc) and an electrical ground (GND). Two other contacts 110 could represent connections for receiving a reset signal (RST) and an external clock signal (CLK). One contact 110 could represent a connection for receiving programming power (Vpp), which is used to reprogram an electrically erasable programmable read only memory or other memory in the smartcard 106. One contact 110 could represent a connection for a serial interface (I/O) with the smartcard reader 104, while two other contacts 110 could represent connections for a USB interface (D+ and D−) with the smartcard reader 104. This represents one specific example of the contacts 110 that could be used in the smartcard 106. The smartcard 106 could include any other or additional contact(s) according to particular needs. Also, if the smartcard 106 communicates wirelessly with the smartcard reader 104, the contacts 110 could be replaced by or the smartcard 106 may further include an antenna. The contacts 110 represent any suitable structures for providing electrical connection to an integrated circuit.

Figure 2:
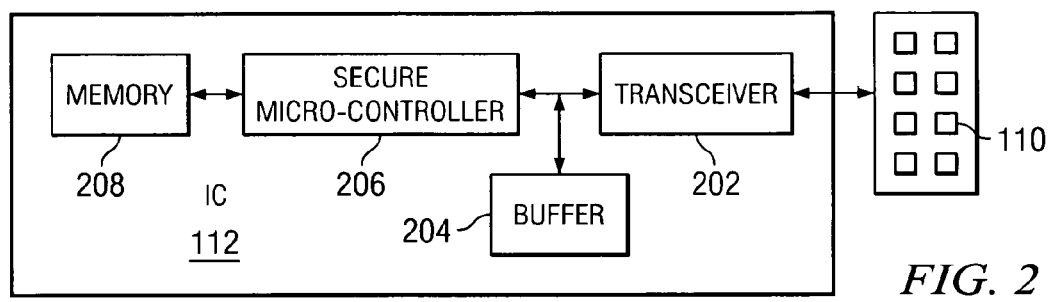
FIG. 2 illustrates an example secure device according to one embodiment of this disclosure.

The integrated circuit 112 is coupled to the contacts 110. The integrated circuit 112 is also encased, recessed in, or otherwise carried by the carrier 108 of the smartcard 106. The integrated circuit 112 performs various functions of the smartcard 106. For example, the integrated circuit 112 could securely store information on the smartcard 106. The integrated circuit 112 could also interact with the host 102 to validate the host 102, to validate the smartcard 106 with the host 102, to provide the secure information to the host 102, or to use the secure information in some way for the host 102. The integrated circuit 112 includes any suitable circuitry or other logic for securing information. One example embodiment of the integrated circuit 112 is shown in FIG. 2, which is described below.

In one aspect of operation, the integrated circuit 112 uses "dummy cycles" to help protect the secure information and defeat attempts to illicitly obtain the secure information. The dummy cycles represent periods of time where one or more components of the integrated circuit 112 attempt to mask their normal operations. In this document, the term "mask" and its derivatives refer to hiding, disguising, camouflaging, concealing, or otherwise obscuring the normal operations of the smartcard 106 or other device. Also, the phrase "normal operations" refers to typical operations of the smartcard 106 or other device that are interrupted, delayed, held, or otherwise affected when the mask is implemented using the dummy cycles. As an example, during a dummy cycle, registers (such as latches or flip-flops) in the integrated circuit 112 could toggle their outputs and then toggle their outputs again. In effect, this causes the registers to change state and then change state again, thereby returning the registers to the state they were in prior to the dummy cycle. Toggling the outputs of the registers may also cause combinatorial logic in the integrated circuit 112 to operate and perform various actions.

The use of dummy cycles in this manner helps to avoid creating a recognizable signature for the dummy cycles. For example, some conventional smartcards prevent a clock generator from outputting clock pulses during the dummy cycles. However, this is easily recognizable since the current consumption is generally zero during these dummy cycles. As another example, some conventional smartcards operate so that each register receives as input the signal it is currently outputting to the combinatorial logic. The register outputs and the combinatorial logic do not change during the dummy cycles, so current consumption is generally stable at a recognizable level during these dummy cycles.

According to this disclosure, the registers and the combinatorial logic in the integrated circuit 112 operate and consume current during dummy cycles. The number of registers toggled during the dummy cycles may be selected so that the current consumption approximates or equals the current consumption of a normal operation. This makes it difficult to spot when the dummy cycles occur. Also, the dummy cycles may be used in a predetermined, random, pseudo-random, or other pattern. This makes it more difficult to spot when the dummy cycles occur. In addition, the number of registers toggled during the dummy cycles could be constant or dynamically adjustable. Dynamically adjusting the number of registers toggled could, for example, allow the current consumption during the dummy cycles to be altered. This makes it even more difficult to spot when the dummy cycles occur. Because the dummy cycles are harder to identify, it becomes more difficult for hackers and other people to identify how the smartcard 106 operates and to access the secure information.

Although FIG. 1 illustrates one example of a system 100 with a secure device, various changes may be made to FIG. 1. For example, while the secure device is shown in FIG. 1 as a smartcard 106, any other secure devices could be used in the system 100. Also, while shown separately in FIG. 1, the host 102 and the smartcard reader 104 could be incorporated into a single functional unit. In addition, the system 100 could include any number of hosts 102, smartcard readers 104, and smartcards 106.

FIG. 2 illustrates an example secure device according to one embodiment of this disclosure. In particular, FIG. 2 illustrates the smartcard 106 of FIG. 1. The embodiment of the smartcard 106 shown in FIG. 2 is for illustration only. Other embodiments of the smartcard 106 may be used without departing from the scope of this disclosure. Also, for ease of explanation, the smartcard 106 is described as operating within the system 100 of FIG. 1. The smartcard 106 could be used in any other suitable system.

As shown in FIG. 2, the integrated circuit 112 includes a transceiver 202 capable of communicating through the contacts 110. For example, the transceiver 202 may transmit information to and receive information from the host 102 via the contacts 110 and the smartcard reader 104. The transceiver 202 includes any suitable transmitter and/or receiver for communicating with a host.

The transceiver 202 is coupled to a buffer 204. The buffer 204 is capable of temporarily storing information received from or being transmitted to a host through the transceiver 202. The buffer 204 represents any suitable quantity and type of memory capable of storing and facilitating retrieval of information.

Figure 3:
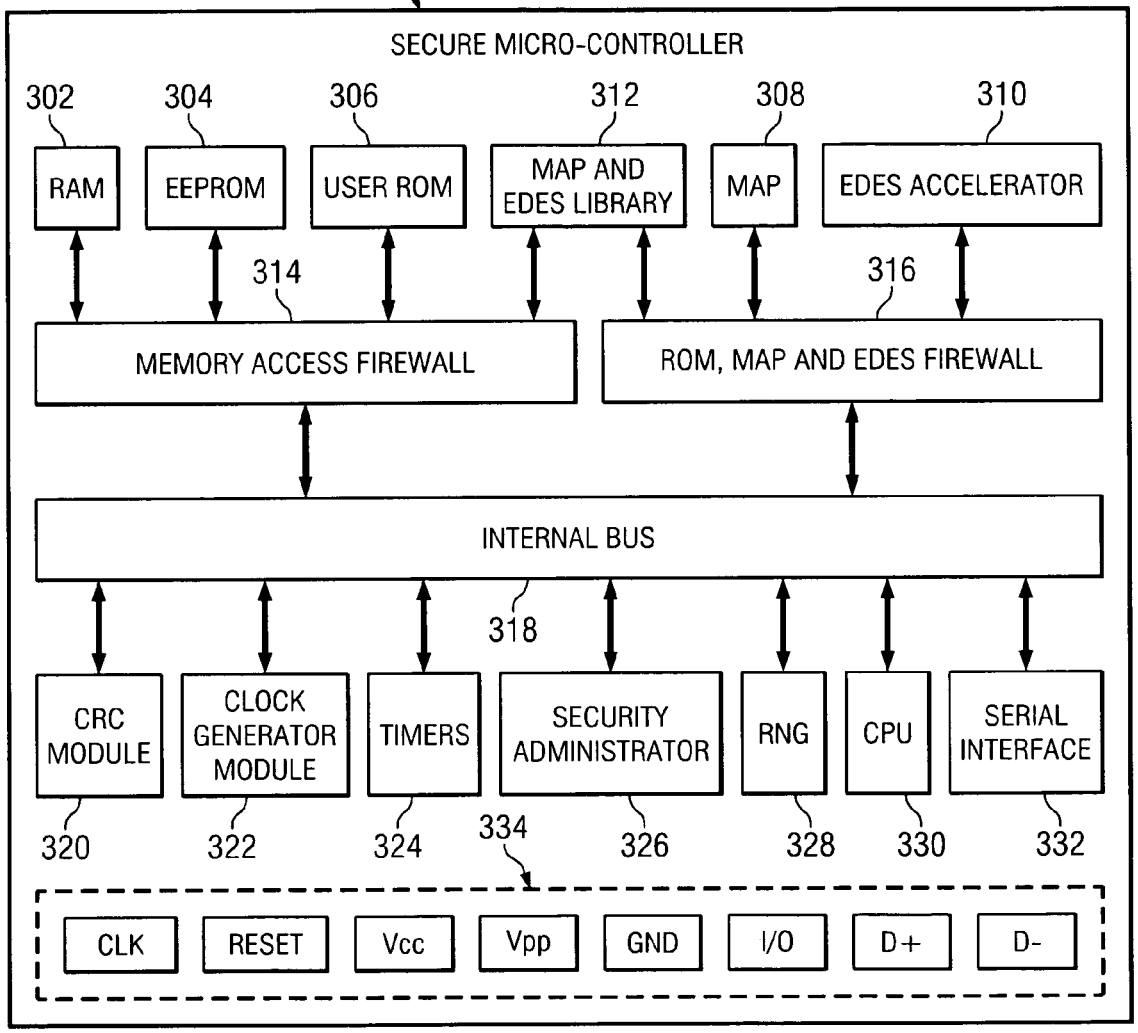
FIG. 3 illustrates an example secure microcontroller in a secure device according to one embodiment of this disclosure.

A secure microcontroller 206 is coupled to the transceiver 202 and the buffer 204. The secure microcontroller 206 is capable of communicating with the host 102 through the transceiver 202. The secure microcontroller 206 is also capable of performing various smartcard operations to secure information stored on the smartcard 106. For example, the secure microcontroller 206 could communicate with the host 102 to exchange and verify unique identifiers of the smartcard 106 and the host 102. The secure microcontroller 206 could also exchange different messages or types of messages with the host 102. As an example, a set of default messages could be sent between the secure microcontroller 206 and the host 102, where each default message has one or more associated alternate messages. The secure microcontroller 206 and the host 102 could switch between the default and alternate messages to make it more difficult to identify how the smartcard 106 operates. The secure microcontroller 206 includes any hardware, software, firmware, or combination thereof for securing information stored on the smartcard 106. The secure microcontroller 206 could, for example, represent an ST19WK08 smartcard controller from STMICROELECTRONICS, INC. One example embodiment of the secure microcontroller 206 is shown in FIG. 3, which is described below. Also, various components of the secure microcontroller 206 operate using dummy cycles as described above to mask their operations.

A memory 208 is coupled to the secure microcontroller 206. The memory 208 is capable of storing information being secured by the smartcard 106. The memory 208 could store any suitable information, such as information identifying a computer user, information needed to receive cable or satellite television services, or bank, credit, or debit card information. The memory 208 may store any other or additional information, such as the default and alternate messages and a secure key seed used for secure communications with the host 102. The memory 208 represents any suitable type and quantity of memory capable of storing and facilitating retrieval of information. The memory 208 could, for example, represent a quantity of non-volatile memory and a quantity of volatile memory.

Although FIG. 2 illustrates one example of a secure device, various changes may be made to FIG. 2. For example, the transceiver 202 could be coupled to an antenna for wireless communication instead of or in addition to being coupled to the contacts 110. Also, various components of FIG. 2 could be omitted, combined, or further subdivided and additional components could be added according to particular needs. In addition, the components shown in FIG. 2 could reside in any secure device and are not limited to use in a smartcard.

FIG. 3 illustrates an example secure microcontroller 206 in a secure device according to one embodiment of this disclosure. The embodiment of the secure microcontroller 206 shown in FIG. 3 is for illustration only. Other embodiments of the secure microcontroller 206 may be used without departing from the scope of this disclosure. Also, for ease of explanation, the secure microcontroller 206 is described as operating in the secure device of FIG. 2 within the system 100 of FIG. 1. The secure microcontroller 206 could be used in any other suitable device and in any other suitable system.

The secure microcontroller 206 includes various memories that store data and instructions used by the secure microcontroller 206. In this example, the secure microcontroller 206 includes a read only memory (RAM) 302, an electrically erasable programmable read only memory (EEPROM) 304, and a read only memory (ROM) 306. The EEPROM 304 and the ROM 306 could store instructions to be executed by the secure microcontroller 206, and the RAM 302 could store data used during execution of the instructions. The memories 302–306 represent any suitable memory or memories for storing and facilitating retrieval of information. Also, any number, quantity, and type of memory or memories could be used in the secure microcontroller 206, such as a four-kilobyte RAM 302, an eight-kilobyte EEPROM 304, and 112-kilobyte ROM 306.

The secure microcontroller 206 also includes a modular arithmetic processor (MAP) 308 and an Enhanced Data Encryption Standard (EDES) accelerator 310. The modular arithmetic processor 308 and the EDES accelerator 310 are used to speed up cryptographic calculations used by Public Key algorithms and Secret Key algorithms. The modular arithmetic processor 308 performs various functions to provide security for the smartcard 106. For example, the modular arithmetic processor 308 could execute asymmetrical algorithms that involve modular multiplication, squaring, and additional calculations. The operands processed by the modular arithmetic processor 308 could represent any suitable operands, such as operands having up to 2,176 bits. The modular arithmetic processor 308 includes any hardware, software, firmware, or combination thereof for implementing asymmetrical algorithms, such as a processor having a 1,088-bit architecture.

The EDES accelerator 310 also performs various functions to provide security for the smartcard 106. For example, the EDES accelerator 310 could execute symmetrical algorithms that include Data Encryption Standard (DES) calculations and triple DES calculations. The EDES accelerator 310 includes any hardware, software, firmware, or combination thereof for implementing symmetrical algorithms.

A library 312 stores information used by various components of the secure microcontroller 206. For example, the library 312 could store cryptographic software libraries used by the modular arithmetic processor 308 and the EDES accelerator 310. The library 312 could represent any suitable memory or memories for storing one or more libraries of information used by the modular arithmetic processor 308, the EDES accelerator 310, or other components, such as a ROM.

Two firewalls 314-316 protect access to the memories 302-306, the modular arithmetic processor 308, the EDES accelerator 310, and the library 312. For example, the firewalls 314-316 may use user-defined access rules stored on the ROM 306 to determine when access to the memories 302-306, the modular arithmetic processor 308, the EDES accelerator 310, and the library 312 is allowed. Each of the firewalls 314-316 represents any suitable hardware, software, firmware, or combination thereof for controlling access to a memory or other component of the secure microcontroller 206.

A bus 318 transports information between various components of the secure microcontroller 206. The bus 318 represents any suitable structure for transporting information, such as an eight-bit bus.

A Cyclic Redundant Check (CRC) module 320 allows verification of the data transmitted from and received at the secure microcontroller 206. For example, the CRC module 320 could generate CRC data for inclusion with data being transmitted by the secure microcontroller 206 to the host 102. The CRC module 320 could also use the CRC data included with data received by the secure microcontroller 206 from the host 102 to verify whether the data was received properly. The CRC module 320 includes any hardware, software, firmware, or combination thereof for performing CRC functions. The CRC module 320 could, for example, support the ISO 3309 standard.

A clock generator module 322 generates one or more clock signals for use by other components of the secure microcontroller 206. Clock signals at any suitable frequency or frequencies may be used in the secure microcontroller 206. The clock generator module 322 represents any structure capable of generating one or more clock signals at one or more frequencies.

One or more timers 324 provide timing functions for various components of the secure microcontroller 206. For example, each timer 324 could be capable of generating an interrupt when a specified amount of time elapses. Each timer 324 represents any suitable hardware, software, firmware, or combination thereof having timing capabilities. As an example, the secure microcontroller 206 could include two eight-bit timers 324.

A security administrator 326 monitors accesses to the secure microcontroller 206 and detects security violations. The security administrator 326 may then take any suitable action, such as generating interrupts or resetting the secure microcontroller 206. The security administrator 326 includes any hardware, software, firmware, or combination thereof for monitoring and controlling security for the secure microcontroller 206.

A random number generator (RNG) 328 generates values for use by other components of the secure microcontroller 206. In some embodiments, the random number generator 328 includes two generators of unpredictable number (GUN) registers compliant with Federal Information Processing Standard (FIPS) 140-2. The random number generator 328 includes any hardware, software, firmware, or combination thereof for generating random or pseudo-random numbers.

A central processing unit (CPU) 330 performs any of a wide variety of functions in the secure microcontroller 206. For example, the central processing unit 330 may execute instructions stored on the ROM 306 to provide desired functionality. The central processing unit 330 represents any suitable processor or combination of processors, such as an eight-bit processor having an extended addressing mode.

A serial interface 332 allows the secure microcontroller 206 to communicate with the smartcard reader 104 through a serial interface (such as through the contact 110 denoted I/O). The serial interface 332 includes any hardware, software, firmware, or combination thereof for supporting communication over a serial link. The serial interface 332 could support any suitable serial protocol(s) or standard(s), such as the ISO 7816 standard.

In addition, the secure microcontroller 206 includes various pins 334. The pins 334 represent connections that may be coupled to or otherwise electrically connected to corresponding contacts 110. The pins 334 represent any suitable structures for providing electrical connection between the secure microcontroller 206 and the contacts 110. In other embodiments, the pins 334 could provide connections to other or additional components, such as an antenna or an internal power supply.

In one aspect of operation, various components of the secure microcontroller 206 shown in FIG. 3 use registers (such as flip-flops or latches) and combinatorial logic to provide various functions. These components could, for example, include the modular arithmetic processor 308, the EDES accelerator 310, the CRC module 320, the timers 324, the security administrator 326, the central processing unit 330, and the serial interface 332. The registers and combinatorial logic are clocked by one or more clock signals, such as clock signals generated by the clock generator module 322 and received via a clock tree. In some embodiments, circuits or other logic may be used in any of these or other components of the secure microcontroller 206 to mask the components' operations using dummy cycles. Example embodiments of these circuits are shown in FIGS. 4A and 4B, which are described below.

Although FIG. 3 illustrates one example of a secure microcontroller 206 in a secure device, various changes may be made to FIG. 3. For example, various components of FIG. 3 could be omitted, combined, or further subdivided and additional components could be added according to particular needs.

Figure 4A:
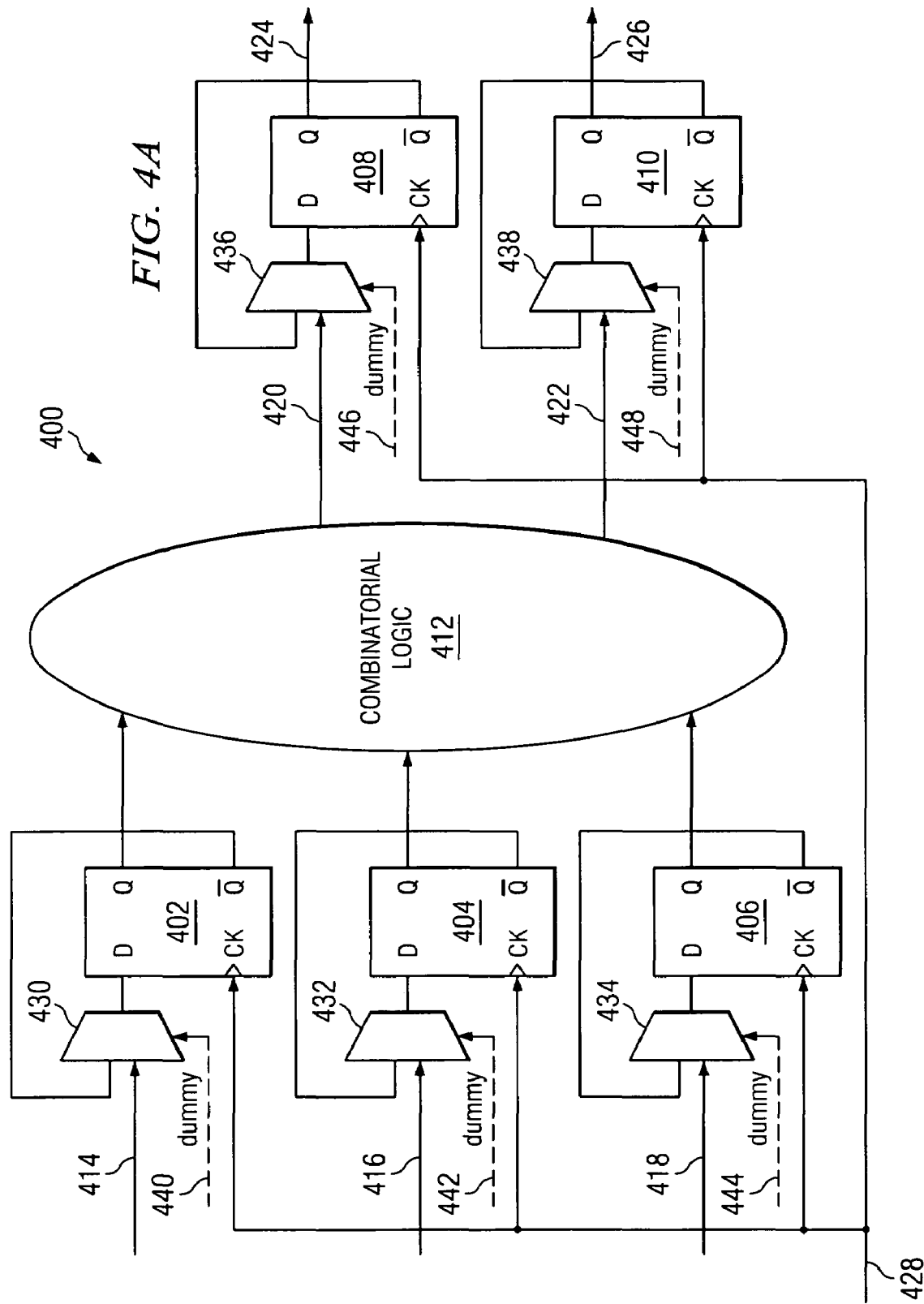

FIGS. 4A and 4B illustrate example circuits 400, 450 for using dummy cycles in a secure microcontroller according to one embodiment of this disclosure. The embodiments of the circuits 400, 450 shown in FIGS. 4A and 4B are for illustration only. Other embodiments of the circuits 400, 450 could be used without departing from the scope of this disclosure. Also, for ease of explanation, the circuits 400, 450 are described as being used in the secure microcontroller 206 of FIG. 3 within the secure device of FIG. 2. The circuits 400, 450 could be used in any other suitable device.

As shown in FIG. 4A, the circuit 400 includes various registers implemented as flip-flops 402–410 and combinatorial logic 412. In general, the flip-flops 402–406 typically receive and latch inputs 414–418, respectively. The latched values are sent to the combinatorial logic 412. In this example, the combinatorial logic 412 produces two outputs 420–422. The outputs 420–422 are provided as inputs to, latched, and output by the flip-flops 408–410 as outputs 424–426. The flip-flops 402–410 are clocked by a clock signal 428.

In FIG. 4A, each of the flip-flops 402–410 produces two outputs. One output is denoted Q, and another output is denoted "not Q" and represents the inverted value of Q. The Q outputs of the flip-flops 402–406 are supplied to the combinatorial logic, and the Q outputs of the flip-flops 408–410 are supplied as the outputs 424–426.

The "not Q" outputs of the flip-flops 402–410 are supplied to multiplexers 430–438, which are placed in front of the flip-flops 402–410, respectively. The multiplexers 430–438 control which values are input to the flip-flops 402–410. Each of the multiplexers 430–438 includes any suitable hardware, software, firmware, or combination thereof for outputting one of multiple input values.

The multiplexers 430–438 are controlled by dummy signals 440–448, respectively. The dummy signals 440–448 determine which input values are output by the multiplexers 430–438 to the flip-flops 402–410. Each of the dummy signals 440–448 could, for example, represent a single-bit signal identifying one of two inputs. The dummy signals 440–448 may originate from any suitable source, such as the central processing unit 330, the security administrator 326, a random or non-predictable signal source, a secret deterministic function based on a linear feedback shift register, or irrelevant or unrelated data or an irrelevant or unrelated operation to modify leakage and mask real computations.

The multiplexers 430–438 are used to implement dummy cycles in the secure microcontroller 206. For example, during normal operation, the dummy signals 440–448 may be set to a first value, and the multiplexers 430–438 provide the inputs 414–422 to the flip-flops 402–410, respectively. During a dummy cycle, the dummy signals 440–448 may be set to a second value, and the multiplexers 430–438 output the "not Q" outputs from the flip-flops 402–410 to the inputs of the flip-flops 402–410.

By clocking the flip-flops 402–410 twice when the dummy signals 440–448 are set to the second value, the flip-flops 402–410 toggle their outputs twice. The first instance toggles the flip-flops 402–410 from their initial outputs to inverted outputs. The second instance toggles the flip-flops 402–410 from the inverted outputs back to the initial outputs. In this way, the flip-flops 402–410 are toggled once and then toggled again to return to their initial "pre-dummy cycle" state. At that point, normal operation of the secure microcontroller 206 may resume.

Because the flip-flops 402–410 are toggling, the flip-flops 402–410 are consuming current during the dummy cycles. Also, the combinatorial logic 412 is receiving different values as input, so the combinatorial logic 412 also consumes current during the dummy cycles. As a result, it may be difficult to identify when the dummy cycles occur. Moreover, the dummy signals 440–448 can be set in any suitable manner, such as a random or pseudo-random manner, making it more difficult to identify when the dummy cycles occur. In addition, the dummy signals 440–448 may be individually generated or generated in groups or subsets, allowing different numbers of multiplexers 430–438 to switch operation during the dummy cycles. Because different multiplexers 430–438 may operate differently during the dummy cycles, this may make it even more difficult to identify when the dummy cycles occur.

The phrase "dummy cycle" may include one or multiple settings of the dummy signals 440–448. For example, the flip-flops 402–410 could be clocked an even number of times each time the dummy signals 440–448 are activated. As another example, the flip-flops 402–410 could be clocked once each time the dummy signals 440–448 are activated, where the dummy signals 440–448 are immediately activated (one after the other) an even number of times. As yet another example, the flip-flops 402–410 could be clocked three times when the dummy signals 440–448 are activated and then clocked once when the dummy signals 440–448 are immediately activated again. In general, a single "dummy cycle" here represents the toggling of the flip-flops 402–410 (or a subset thereof) so that the flip-flops 402–410 return to their "pre-dummy cycle" state before normal operations resume, no matter how many times the dummy signals 440–448 (or a subset thereof) are activated.

Any suitable number of dummy cycles may be used during operation of the secure microcontroller 206. In particular embodiments, the number of dummy cycles depends on a security versus performance tradeoff. More dummy cycles may result in better security with slower performance, while fewer dummy cycles may result in better performance with lower security.

The circuit 450 shown in FIG. 4B is similar to the circuit 400 shown in FIG. 4A. In FIG. 4B, multiplexers 450–458 are associated with the flip-flops 402–410, and the multiplexers 450–458 are controlled by dummy signals 460–468. As with the circuit 400 in FIG. 4A, the multiplexers 450–458 in FIG. 4B receive the inputs 414–422 and the "not Q" outputs of the flip-flops 402–410. In addition, the multiplexers 450–458 in FIG. 4B receive the Q outputs of the flip-flops 402–410. The dummy signals 460–468 then control which of the three inputs to the multiplexers 450–458 are output by the multiplexers 450–458. Each of the dummy signals 460–468 could, for example, represent a multiple-bit signal identifying one of three inputs. Providing the Q outputs of the flip-flops 402–410 to the multiplexers 450–458 could provide one or several benefits, such as improving timing paths within the circuit 450.

It should be noted that FIGS. 4A and 4B have illustrated the use of registers formed from D flip-flops. However, registers formed from any other or additional components could be used in the circuits 400, 450. In general, a register represents any suitable structure capable of holding a value. Also, FIGS. 4A and 4B have illustrated the use of multiplexers to cause the registers to toggle their outputs during one or more dummy cycles. However, any other circuitry (generally referred to as "dummy cycle circuitry") could be used to cause any suitable type of register to toggle its output.

Although FIGS. 4A and 4B illustrate examples of circuits 400, 450 for using dummy cycles in a secure microcontroller, various changes may be made to FIGS. 4A and 4B. For example, fewer than all of the registers may be associated with multiplexers. Also, the circuits 400, 450 could include any suitable number of inputs, registers, multiplexers, combinatorial logic, and outputs.

Figure 5:
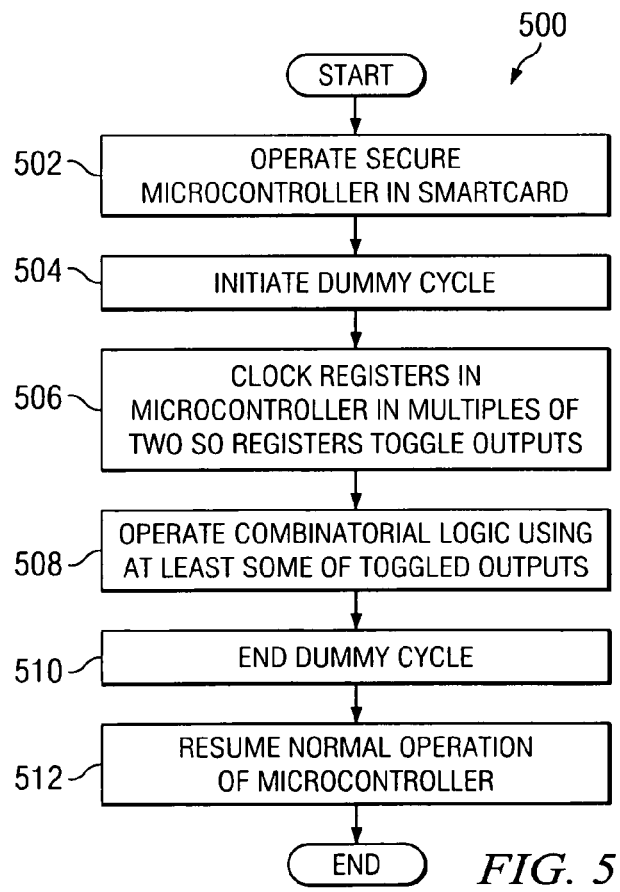
FIG. 5 illustrates an example method for using dummy cycles in a secure microcontroller according to one embodiment of this disclosure.

FIG. 5 illustrates an example method 500 for using dummy cycles in a secure microcontroller according to one embodiment of this disclosure. For ease of explanation, the method 500 is described with respect to the circuits 400, 450 of FIGS. 4A and 4B operating in one or more components of the secure microcontroller 206 of FIG. 3. The method 500 could be used with any other suitable circuits and in any other suitable device.

The secure microcontroller 206 is operated normally in the smartcard 106 or other secure device at step 502. This may include, for example, components within the secure microcontroller 206 executing instructions and otherwise performing normal operations to provide security for information stored on the smartcard 106.

The secure microcontroller 206 initiates a dummy cycle at step 504. This may include, for example, a signal source activating one or more of the dummy signals 440-448, 460-468 in the secure microcontroller 206. This may also include the dummy signals 440-448, 460-468 altering the outputs of the multiplexers 430-438, 450-458 in the secure microcontroller 206.

The secure microcontroller 206 clocks the registers in the secure microcontroller 206 in multiples of two during the dummy cycle at step 506. This may include, for example, providing multiple clock pulses to the flip-flops 402-410 during the dummy cycle. Because of the clocking, the registers in the secure microcontroller 206 repeatedly toggle their outputs.

The secure microcontroller 206 operates the combinatorial logic 412 using at least some of the outputs of the flip-flops 402-410 at step 508. This may include, for example, the combinatorial logic 412 receiving the outputs of the flip-flops 402-406 and performing various combinatorial operations using the toggled outputs. In this document, the phrase "combinatorial operations" refers to any operation performed by combinatorial logic, such as AND, OR, NAND, NOR, XOR, and latching operations.

The dummy cycle ends at step 510. This may include, for example, the signal source deactivating the one or more dummy signals 440-448, 460-468 in the secure microcontroller 206. This may also include the dummy signals 440-448, 460-468 altering the outputs of the multiplexers 430-438, 450-458 in the secure microcontroller 206. Because the registers in the secure microcontroller 206 were clocked in multiples of two during the dummy cycle, the flip-flops 402-410 in the secure microcontroller 206 should be in the same state they were in prior to the dummy cycle starting.

The secure microcontroller 206 resumes normal operation at step 512. This may include, for example, resuming execution of the instructions and otherwise resuming normal operations at the point where the normal operations were interrupted by the dummy cycle. The method 500 could then end, or the method 500 could return to step 504 to initiate an additional dummy cycle.

Although FIG. 5 illustrates one example of a method 500 for using dummy cycles in a secure microcontroller, various changes may be made to FIG. 5. For example, various steps in FIG. 5 may overlap, such as when steps 506 and 508 overlap during the one or more dummy cycles.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
a plurality of registers;
combinatorial logic capable of receiving at least one output value provided by at least one of the registers, the combinatorial logic also capable of performing one or more combinatorial operations using the at least one received output value; and
dummy cycle circuitry capable of causing one or more of the registers and the combinatorial logic to change state and consume current during one or more dummy cycles.

2. The apparatus of claim 1, wherein:
the registers and the combinatorial logic are capable of performing one or more normal operations during non-dummy cycles; and
the dummy cycle circuitry is capable of causing the one or more registers and the combinatorial logic to change state and consume current during the one or more dummy cycles to mask the one or more normal operations of the registers and the combinatorial logic.

3. The apparatus of claim 2, wherein:
the one or more registers and the combinatorial logic are in an original state prior to one of the dummy cycles; and
during the dummy cycle, the one or more registers and the combinatorial logic change state an even number of times and return to the original state before the one or more normal operations are resumed after the dummy cycle.

4. The apparatus of claim 1, wherein the dummy cycle circuitry comprises:
at least one multiplexer, each multiplexer associated with one of the registers, each multiplexer capable of providing a value as an input to the associated register.

5. The apparatus of claim 4, wherein the value provided as the input to the associated register is selected from:
an input value received by the multiplexer from a source other than the associated register; and
at least one output value produced by the associated register.

6. The apparatus of claim 4, wherein:
at least one of the registers comprises a D flip-flop;
the D flip-flop generates a non-inverted output value and an inverted output value; and
the value provided as the input to the associated register comprises one of:
an input value received by the multiplexer from a source other than the D flip-flop;

the non-inverted output value generated by the D flip-flop; and the inverted output value generated by the D flip-flop.

7. The apparatus of claim 4, wherein the at least one multiplexer comprises a plurality of multiplexers, each register associated with one of the multiplexers.

8. The apparatus of claim 1, wherein the one or more dummy cycles are based on at least one of: a random signal source, a non-predictable signal source, irrelevant or unrelated data, and an irrelevant or unrelated operation.

9. The apparatus of claim 1, wherein the registers, combinatorial logic, and dummy cycle circuitry form part of a secure microcontroller in a smartcard.

10. The apparatus of claim 9, further comprising:
a memory capable of storing information secured by the secure microcontroller; and
a transceiver capable of supporting communication between the secure microcontroller and a host via at least one of: a plurality of electrical contacts and an antenna.

11. A secure device, comprising:
a memory capable of storing information; and
a secure microcontroller capable of securing the information in the memory, the secure microcontroller comprising:
a plurality of registers;
combinatorial logic capable of receiving at least one output value provided by at least one of the registers, the combinatorial logic also capable of performing one or more combinatorial operations using the at least one received output value; and
dummy cycle circuitry capable of causing one or more of the registers and the combinatorial logic to change state and consume current during one or more dummy cycles.

12. The secure device of claim 11, wherein the dummy cycle circuitry comprises:
at least one multiplexer, each multiplexer associated with one of the registers, each multiplexer capable of providing a value as an input to the associated register.

13. The secure device of claim 12, wherein:
at least one of the registers comprises a D flip-flop;
the D flip-flop generates a non-inverted output value and an inverted output value; and
the value provided as the input to the associated register comprises one of:
an input value received by the multiplexer from a source other than the D flip-flop;
the non-inverted output value generated by the D flip-flop; and
the inverted output value generated by the D flip-flop.

14. The secure device of claim 12, wherein the at least one multiplexer comprises a plurality of multiplexers, each register associated with one of the multiplexers.

15. The secure device of claim 11, wherein the one or more dummy cycles are based on at least one of: a random signal source, a non-predictable signal source, irrelevant or unrelated data, and an irrelevant or unrelated operation.

16. The secure device of claim 11, wherein:
the registers and the combinatorial logic are capable of performing one or more normal operations during non-dummy cycles;

the dummy cycle circuitry is capable of causing the one or more registers and the combinatorial logic to change state and consume current during the one or more dummy cycles to mask the one or more normal operations of the registers and the combinatorial logic;

the one or more registers and the combinatorial logic are in an original state prior to one of the dummy cycles; and during the dummy cycle, the one or more registers and the combinatorial logic change state an even number of times and return to the original state before the one or more normal operations are resumed after the dummy cycle.

17. A method, comprising:
operating a plurality of registers and combinatorial logic, the combinatorial logic capable of receiving at least one output value provided by at least one of the registers, the combinatorial logic also capable of performing one or more combinatorial operations using the at least one received output value; and
during operation of the registers and the combinatorial logic, causing one or more of the registers and the combinatorial logic to change state and consume current during one or more dummy cycles.

18. The method of claim 17, wherein causing the one or more registers and the combinatorial logic to change state and consume current during one or more dummy cycles comprises:
using a plurality of multiplexers to control values input to the registers.

19. The method of claim 18, wherein:
the registers comprise D flip-flops;
each D flip-flop generates a non-inverted output value and an inverted output value; and
the value input to one of the D flip-flops by one of the multiplexers comprises one of:
an input value received by the multiplexer from a source other than the D flip-flop;
the non-inverted output value generated by the D flip-flop; and
the inverted output value generated by the D flip-flop.

20. The method of claim 17, wherein:
the registers and the combinatorial logic are capable of performing one or more normal operations during non-dummy cycles;
causing the one or more registers and the combinatorial logic to change state and consume current during the one or more dummy cycles masks the one or more normal operations of the registers and the combinatorial logic;
the one or more registers and the combinatorial logic are in an original state prior to one of the dummy cycles; and
during the dummy cycle, the one or more registers and the combinatorial logic change state an even number of times and return to the original state before the one or more normal operations are resumed after the dummy cycle.

* * * * *